United States Patent [19]
Fukushima et al.

[11] Patent Number: 5,166,244
[45] Date of Patent: Nov. 24, 1992

[54] ACRYLIC RUBBER COMPOSITION

[75] Inventors: Motoo Fukushima, Kanagawa; Shoji Ichinohe, Gunma, both of Japan

[73] Assignee: Shin-Etsu Chemical Company Limited, Tokyo, Japan

[21] Appl. No.: 619,547

[22] Filed: Nov. 29, 1990

[30] Foreign Application Priority Data

Nov. 30, 1989 [JP] Japan .................................. 1-311586

[51] Int. Cl.$^5$ .......................... C08F 30/08; C08K 5/54
[52] U.S. Cl. .................................... 524/269; 526/279; 524/263; 524/267
[58] Field of Search ....................... 524/269, 263, 267; 526/279

[56] References Cited

U.S. PATENT DOCUMENTS 4,722,975 2/1988 Itoh et al. .

FOREIGN PATENT DOCUMENTS 60-195148 10/1985 Japan .
62-40380 8/1987 Japan .

Primary Examiner—Joseph L. Schofer
Assistant Examiner—Jeffrey T. Smith
Attorney, Agent, or Firm—Millen, White, Zelano and Branigan

[57] ABSTRACT

A novel acrylic rubber composition is proposed which has excellent moldability and good releasability from the metallic surfaces of milling rollers for the compounding works and metal molds for shaping and vulcanizing the composition into vulcanizates. The composition comprises: (a) an acrylic copolymer as the rubber base; (b) carbon black or a finely divided silica filler as a reinforcing agent; and (c) an organopolysiloxane having, in a molecule, at least one carboxyl-functional group such as ω-carboxyl undecyl group, bonded to the silicon atom, which can be prepared, for example, by the hydrosilation reaction between a SiH-containing organopolysiloxane and an alkyl undecylenate followed by hydrolysis of the ester group into carboxyl group.

12 Claims, No Drawings

ACRYLIC RUBBER COMPOSITION

BACKGROUND OF THE INVENTION

The present invention relates to an acrylic rubber composition or, more particularly, to an acrylic rubber composition having good moldability and capable of giving a vulcanizate exhibiting excellent heat and cold resistance and oil resistance to be useful as a material of rubber parts of automobiles.

In the prior art, NBR rubbers are the most conventional as a rubbery material for automobile parts but it is a trend in recent years that acrylic rubbers are widely used for the application in an increasing amount by virtue of the well balanced properties of the vulcanizates in place of NBR rubbers.

A problem in the use of acrylic rubbers, as compared with NBR rubbers, is that acrylic rubbers in general have relatively low cold resistance. Several attempts have been made with an object to improve the cold resistance of acrylic rubbers. For example, firstly, the glass transition point Tg of an acrylic rubber can be decreased by using methyl acrylate or methoxymethyl acrylate capable of giving a polymer of a relatively low glass transition point in place of ethyl acrylate giving a polymer of a relatively high glass transition point as the comonomer to be copolymerized with an plasticizer, such as polyether-based or polyester-based oils, which is compatible with the polymer of the acrylic rubber to decrease the glass transition point of the resultant polymeric composition as compared with the polymer per se. The above mentioned first method has a problem that the decrease in the glass transition point of the polymer is necessarily accompanied by a decrease in the workability such as a decrease in the consistency and adhesion of the rubber composition under milling to the roller. The second method is disadvantageous because the amount of the oil to be added is so large as to be 5 to 20 parts by weight per 100 parts by weight of the rubber and the rubber compound has a decreased Mooney viscosity and the vulcanizate thereof has decreased mechanical strengths and heat resistance. Thus, acrylic rubbers having satisfactory cold resistance have not yet been obtained from the practical standpoint.

Further, it is also known that the cold resistance of an acrylic rubber can be improved by compounding the rubber with an organopolysiloxane. For example, Japanese Patent Kokai 60-195149 proposes a diorganopolysiloxane, or which from 15 to 50% by moles of the organic groups bonded to the silicon atoms are fluorine-containing hydrocarbon groups, as the organopolysiloxane additive. Japanese Patent Kokai 60-195148 proposes a method in which from 10 to 90% by weight of an acrylic polymer is compounded with 90 to 10% by weight of a diorganopolysiloxane and 0.5 to 30% by weight of a fluorine-containing polysiloxane as a compatibility improver. Japanese Patent Kokai 60-152552 proposes use of a siloxane acrylic acid ester containing aliphatically unsaturated groups as the compatibility improver. Further, Japanese Patent Kokai 55-7814 proposes use of 5 to 50% by weight of a copolymer of an organosiloxane and an acrylic acid ester as the compatibility improver. These prior art proposals each have an object to improve the miscibility of an acrylic rubber and a silicone rubber of which the miscibility is inherently poor. Accordingly, each of these methods has a problem that the amount of the silicone rubber to be compounded with the acrylic rubber must be so large as to be 10% by weight or larger based on the acrylic rubber.

Besides, it has been proposed that the properties of acrylic rubbers such as moldability can be improved by compounding the rubber with a long-chain fatty acid such as stearic acid. This method, however, is not practical, in particular, for the acrylic rubbers having improved cold resistance as mentioned above due to the remarkable adhesion of the rubber composition under milling to the surface of the milling roller even by the use of a large amount of stearic acid.

SUMMARY OF THE INVENTION

Thus, the present invention, which has been completed with an object to provide an improved acrylic rubber composition without the above described problems and disadvantages in the conventional acrylic rubber compositions, provides an acrylic rubber composition which comprises, as a blend:

(a) 100 parts by weight of an acrylic polymer which is a copolymerizate of an ester of acrylic or methacrylic acid represented by the general formula

$$CH_2=CR^1-CO-OR^2, \quad (I)$$

in which $R^1$ is a hydrogen atom or a methyl group and $R^2$ is an unsubstituted or substituted alkyl group or alkoxyalkyl group, and a monomeric compound having, in a molecule, at least two aliphatically unsaturated linkages;

(b) from 10 to 150 parts by weight of a reinforcing carbon powder or finely divided silica filler having a specific surface area of at least 10 m²/g; and (c) from 0.5 to 5 parts by weight of an organopolysiloxane represented by the general formula

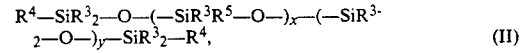

$$R^4-SiR^3_2-O-(-SiR^3R^5-O-)_x-(-SiR^3_2-O-)_y-SiR^3_2-R^4, \quad (II)$$

in which $R^3$ is an unsubstituted or substituted monovalent hydrocarbon group having 1 to 6 carbon atoms, $R^4$ and $R^5$ are each a methyl group or a carboxyl-functional group bonded to the silicon atom through an Si—C linkage with the proviso that at least either one of the groups denoted by $R^4$ and $R^5$ is not a methyl group, and x and y are each a positive integer with the proviso that x+y is in the range from 5 to 800 and x:y is in the range from 0.01 to 0.1 on an average.

DETAILED DESCRIPTION OF THE PREFERRED EMBODIMENTS

As is described above, the most characteristic feature in the inventive acrylic rubber composition is the above specified unique organopolysiloxane as the component (c). By virtue of the formulation with this organopolysiloxane, the acrylic rubber composition of the invention is imparted with greatly improved low-temperature characteristics along with improvement in the adhesiveness to the surface of rollers to facilitate milling, sheeting, extrusion and calendering of the composition by using rollers. Further, the rubber composition has good mold-releasability so that the rubber vulcanizate shaped in a metal mold can easily be taken out of the metal mold. In addition, the vulcanizate of the rubber composition has excellent mechanical strengths and oil resistance and, in particular, the permanent compression set is so small even in the vulcanizate cured with an organic peroxide as the vulcanizing agent.

The inventive acrylic rubber composition comprises, as the essential ingredients, the above defined components (a), (b) and (c). The rubbery polymeric ingredient is the component (a) which is an acrylic polymer obtained by the copolymerization of an ester of acrylic or methacrylic acid represented by the general formula $$CH_2=CR^1-CO-OR^2, \quad (I)$$

in which $R^1$ is a hydrogen atom or methyl group and $R^2$ is an unsubstituted or substituted alkyl group or alkoxyalkyl group, and a monomer having at least two aliphatically unsaturated linkages in a molecule.

Examples or the group denoted by $R^2$ in the above given general formula (I) for the acrylic or methacrylic acid ester include methyl, ethyl, propyl, n-butyl, 2-methoxy ethyl and 2-ethoxy ethyl groups as well as trifluoromethyl group, 2,2,2-trifluoroethyl group, 3,3,3-trifluoropropyl group and the like obtained by replacing a part or all of the hydrogen atoms in the above named alkyl groups with fluorine atoms and the like.

The comonomer to be copolymerized with the acrylic or methacrylic acid ester of the general formula (I) should have at least two aliphatically unsaturated linkages in a molecule. This comonomer is copolymerized with the acrylic or methacrylic acid ester at one of the aliphatically unsaturated linkages while the other of the aliphatically unsaturated linkages in the molecule remains intact, without pertaining to the copolymerization reaction, in the acrylic copolymer to serve as the crosslinking site when the rubber composition is vulcanized with an organic peroxide as the vulcanizing agent. In this regard, these two aliphatically unsaturated linkages in a molecule of the comonomer should have different reactivity each from the other.

Examples of such a comonomer having at least two aliphatically unsaturated linkages in a molecule include ethylidene norbornene, methylidene norbornene, dicyclopentadiene and the like but it is preferably a monomeric compound having an aliphatically unsaturated group or, in particular, vinyl group bonded to a silicon atoms such as esters of acrylic or methacrylic acid having a group substituted with a silicon-bonded vinyl group. The vinyl group bonded to a silicon atom in such a monomeric compound is less reactive than the ethylenically unsaturated linkage in the acrylate or methacrylate structure in the comonomer in respect of the copolymerizability with the acrylic or methacrylic acid ester of the general formula (I). Accordingly, the vinyl groups bonded to the silicon atoms in the comonomer remain intact not to cause gelation of the copolymer and to serve as the crosslinking sites in the vulcanization of the rubber composition with an organic peroxide as the vulcanizing agent.

Examples of such an acrylic or methacrylic monomer having a silicon-bonded vinyl group in the molecule are given, for example, in Japanese Patent Publication No. 62-40380, of which those particularly preferable in the invention include the compounds expressed by the following structural formulas (1) to (5), in which R is a hydrogen atom or methyl group, Vi is a vinyl group, Pn is a 1,4-phenylene group and the subscript n is zero or a positive integer not exceeding 15:

$$CH_2=CR-CO-O-CH_2-SiMe_2-O-SiMe_2-CH=CH_2; \quad (1)$$

$$CH_2=CH-Pn-SiMe_2-O-SiMe_2-CH=CH_2; \quad (2)$$

$$CH_2=CR-CO-O-(-CH_2-)_3-SiMe_2-CH=CH_2; \quad (3)$$

$$CH_2=CR-CO-O-(-CH_2-)_3-SiMe_2-(-O-SiMe_2-)_n-O-SiMe_2CH=CH_2; \text{ and} \quad (4)$$

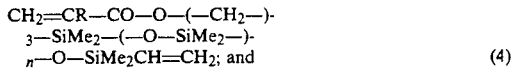
(5)

More preferably, the comonomer should be the compound expressed by the above given structural formula (5). The compound of the structural formula (5) in which R is a methyl group is available as a commercial product (AV-100, a product by Shin-Etsu Chemical Co.). When such a compound of the structural formula (5) is used as the comonomer copolymerized with the acrylic or methacrylic acid ester of the general formula (I), the crosslinking points in the acrylic copolymer are constituted by the vinyl groups in the cyclic organopolysiloxane structure having very high thermal stability so that the acrylic rubber is imparted with excellent heat resistance to exhibit excellent characteristics of the vulcanizate.

The amount of the comonomer having at least two aliphatically unsaturated linkages in a molecule to be copolymerized with the acrylic or methacrylic acid ester of the general formula (I) should be in the range from 0.01 to 10 parts by weight per 100 parts by weight of the acrylic or methacrylic acid ester.

The component (b) in the inventive acrylic rubber composition is a reinforcing filler which can be a carbon black or a finely divided silica filler having a specific surface area of at least 10 m²/g. Types of the carbon black are not particularly limitative including, for example, HAF, SRF, FEF and the like. The finely divided silica filler includes fumed silica fillers and precipitated silica fillers. The amount of the reinforcing filler as the component (b) in the inventive rubber composition is in the range from 10 to 150 parts by weight or, preferably, from 30 to 80 parts by weight per 100 parts by weight of the acrylic copolymer as the component (a). When the amount of the reinforcing filler is too small, no sufficient reinforcing effect can be obtained. When the amount thereof is too large, on the other hand, the rubber composition cannot give a vulcanizate having high mechanical properties or, in particular, rubbery elasticity. When the reinforcing filler is a finely divided silica filler, it is preferable that the filler is compounded together with a wetting agent such as various kinds of functional organosilane compounds, low-molecular organopolysiloxanes and the like according to need.

The component (c) in the inventive acrylic rubber composition is an organopolysiloxane represented by the general formula $$R^4-SiR^3{}_2-O-(-SiR^3R^5-O-)_x-(-SiR^3{}_2-O-)_y-SiR^3{}_2-R^4, \quad (II)$$

in which $R^3$ is an unsubstituted or substituted monovalent hydrocarbon group having 1 to 6 carbon atoms exemplified by alkyl groups such as methyl, ethyl, propyl, butyl and hexyl groups, cycloalkyl groups such as cyclohexyl group, alkenyl groups such as vinyl and allyl groups and aryl groups such as phenyl group as well as those substituted groups obtained by replacing a part or all of the hydrogen atoms in the above named hydrocarbon groups with halogen atoms, cyano groups and the like such as chloromethyl, 3,3,3-trifluoropropyl and 2-cyanoethyl groups. It is preferable that at least 50% in number of the groups denoted by $R^3$ in a molecule are methyl groups. The symbols $R^4$ and $R^5$ in the formula each denote a methyl group or a carboxyl-functional group bonded to the siloxane structure by forming an Si-C linkage but at least either one of them cannot be a methyl group. The above mentioned carboxyl group is bonded to the silicon atom through a divalent group having 2 to 25 carbon atoms. The divalent group can be an alkylene group or an alkylene group having an oxygen atom or sulfur atom between carbon atoms forming an ether linkage or thioether linkage, respectively. Examples of the carboxyl-functional group include those expressed by the following formulas:

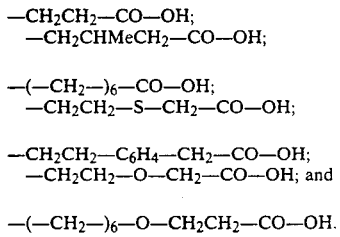

The above described component (c) is compounded in the inventive acrylic rubber composition with an object to improve the roll-workability of the composition and mold-releasability of the vulcanizate of the composition from metal molds. Such an effect is exhibited presumably by means of the carboxyl-functional groups existing on the rubber composition under roll milling or the vulcanizate in a metal mold contributing to the releasability from the metallic surface.

The amount of the component (c) in the inventive acrylic rubber composition is in the range from 0.5 to 5 parts by weight or, preferably, from 1 to 2 parts by weight per 100 parts by weight of the acrylic copolymer as the component (a). When the amount of the component (c) is too small, no sufficient improvement can be obtained in the surface releasability of the composition or vulcanizate. When the amount of the component (c) is too large, on the other hand, adverse influences are caused in the mechanical properties of the vulcanizates obtained from the composition.

The organopolysiloxane as the component (c) can be prepared, for example, in the following manner. For example, methyl undecylenate or an alkyl ester of other unsaturated carboxylic acid is reacted with an organopolysiloxane having a silicon-bonded hydrogen atom, e.g., 1,1,3,3-tetramethyl disiloxane, to effect the hydrosilation reaction in the presence of a platinum catalyst to give a silyl-substituted carboxylic acid ester followed by hydrolysis with an alkali to convert the alkyl ester into the form of a free acid. The molecular weight of the organopolysiloxane can be controlled according to a known procedure by the siloxane rearrangement reaction in the presence of an acid catalyst with a hexaalkyl disiloxane such as hexamethyl disiloxane and a cyclo(dialkylpolysiloxane) such as octamethyl cyclotetrasiloxane. The organopolysiloxane as the component (c) should have such a degree of polymerization that the sum of x and y in the general formula (II), i.e. $x+y$, is in the range from 5 to 800.

The acrylic rubber composition of the invention can be prepared by uniformly blending the above described essential components (a), (b) and (c) each in a specified amount. It is usual that the rubber composition is further admixed with a vulcanizing agent or curing agent which can be any of known ones producing free radicals at an elevated temperature. Examples of suitable free radical-producing curing agents include azo compounds such as azobisisobutyronitrile and organic peroxides such as benzoyl peroxide, tert-butyl perbenzoate, dicumyl peroxide, 2,4-dichlorobenzoyl peroxide, bis(tert-butyl) peroxide, p-chlorobenzoyl peroxide, 2,5-bis(tert-butylperoxy)-2,5-dimethyl hexane, 1,1-bis(tert-butylperoxy)-3,3,5-trimethyl cyclohexane and alkylperoxy alkyl carbonates, e.g., tert-butylperoxy isopropyl carbonate. The amount of these organic peroxides in the inventive composition is usually in the range from 0.5 to 5 parts by weight per 100 parts by weight of the composition though not particularly limitative thereto depending on the particular formulation of the composition.

In the following, the acrylic rubber composition of the invention is described in more detail by way of examples, in which the term of "parts" always refers to "parts by weight". The examples are preceded by the description of the preparation procedures for the acrylic copolymers used as the component (a) and the organopolysiloxane as the component (c). The releasability from metal molds given in the examples is the result of the evaluation test undertaken in the following manner.

Thus, the rubber composition was molded and vulcanized between two steel plates and the vulcanized rubber was taken off the steel plates by hand to evaluate the easiness of peeling from the steel plate in eleven ratings of 0 to 10 according to the following criteria.
10: The vulcanizate could be separated from the steel plate by the weight of the vulcanizate alone.
7: The vulcanizate could be separated from the steel plate by applying a small pulling force.
5: The vulcanizate could be separated from the steel plate by applying a pulling force of a substantial strength.
0: The vulcanizate firmly adhered to the steel plate.

SYNTHETIC PREPARATION 1

An acrylic copolymer, referred to as the polymer-I hereinbelow, was prepared by emulsion polymerization in the following manner. Thus, a polymerization mixture was prepared by blending, in 250 parts of water containing 5 parts of sodium dodecylbenzene sulfonate as an emulsifier as the polymerization medium, 30 parts of ethyl acrylate, 30 parts of n-butyl acrylate, 30 parts of 2-ethylhexyl acrylate and 1 part of the organopolysiloxane having aliphatically unsaturated groups expressed by the structural formula (5) given before with a methyl group as R(AV-100, a product by Shin-Etsu Chemical Co.) together with 0.02 part of tert-butyl hydroperoxide, 0.005 part of iron (II) sulfate and 0.05 part of l-ascorbic acid as a redox-type polymerization initiator system and the copolymerization reaction was performed at 5° C. for 8 hours to give an acrylic copolymer, i.e. the polymer-I.

Similarly, another acrylic copolymer, referred to as the polymer-II hereinbelow, was prepared from 70 parts of n-butyl acrylate, 30 parts of 2-methoxyethyl acrylate and 0.5 part of AV-100 using the same initiator system as in the preparation of the polymer-I.

SYNTHETIC PREPARATION 2

A carboxyl group-containing organopolysiloxane was prepared in the following manner. Thus, 1 mole of 1,1,3,3-tetramethyl disiloxane was reacted with 2 moles of methyl undecylenate at 110° C. in the presence of chloroplatinic acid as a catalyst and the reaction mixture after completion of the reaction was alkalified with potassium hydroxide to effect hydrolysis. The reaction mixture was then acidified with sulfuric acid and extracted with diethyl ether. The ether extract was freed from ether by evaporation to give a carboxyl group-containing organopolysiloxane as a product which was 1,1,3,3-tetramethyl-1,3-di($\omega$-carboxyldecyl) disiloxane of the formula

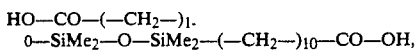

in which Me is a methyl group.

Then, 15.2 g (0.06 mole) of the above obtained carboxyl group-containing disiloxane compound were admixed with 69.5 g (0.235 mole) of octamethyl cyclotetrasiloxane and 4.9 g of hexamethyl disiloxane together with 1% by weight of concentrated sulfuric acid and the mixture was agitated at 60° C. for 8 hours to effect the siloxane rearrangement reaction followed by neutralization with sodium hydroxide to give an $\omega$-carboxyldecyl-terminated dimethyl polysiloxane expressed by the average structural formula

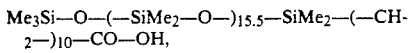

which is referred to as the siloxane A hereinbelow.

This siloxane A had a viscosity of 65 centistokes at 25° C., specific gravity of 0.95 and refractive index of 1.412.

EXAMPLE 1

An acrylic rubber composition, referred to as the composition I hereinbelow, was prepared by compounding 100 parts of the polymer-I obtained in Synthetic Preparation 1 described above with 1 part of the siloxane A, 60 parts of a fumed silica filler (Nipsil Lp VN3, a product by Nippon Silica Co.), 1 part of an aging retarder (Nauguard 445, a product by Uniroyal Co.) and 5 parts of a dispersing aid for the silica filler (LS-520, a product by Shin-Etsu Chemical Co.).

A curable acrylic rubber composition I was prepared by compounding 100 parts of the above prepared composition I with 2 parts of a curing agent (C-13, a product by Shin-Etsu Chemical Co.), which was a pasty blend of 65% by weight of 1,1-bis(tert-butylperoxy)-3,3,5-trimethyl cyclohexane and 35% by weight of a silica powder, and 1 part of N,N'-1,3-phenylene dimaleimide as a vulcanization accelerator (SEP-BM, a product by Shin-Etsu Chemical Co.) followed by a deaeration treatment by heating at 110° C. for 30 minutes.

The thus obtained curable rubber composition I was compression-molded and vulcanized in a metal mold of 2 mm by 150 mm by 170 mm dimensions at 155° C. for 10 minutes under a pressure of the press of 30 kg/cm² followed by post-curing at 180° C. for 3 hours in an oven to give a test specimen. The composition had excellent moldability. Table 1 below shows the releasability of the composition and the mechanical properties of the vulcanized test specimens of the composition.

EXAMPLE 2

A second curable acrylic rubber composition, referred to as the composition II hereinbelow, was prepared in substantially the same manner as in Example 1 excepting replacement of the polymer-I with the same amount of the polymer-II, replacement of the silica filler with the same amount of a HAF carbon black and replacement of the dispersion aid LS-520 with the same amount of a plasticizer (RS-700, a product by Adeka Argus Co.). The curable composition II also had excellent moldability. The results of testing of this composition are shown in Table 1.

EXAMPLE 3

The experimental procedure for the preparation of a further acrylic rubber composition referred to as the composition III hereinbelow, was substantially the same as in Example 2 described above except that the composition was further admixed with 1 part of stearic acid. The curable composition III also had excellent moldability. The results of testing are shown in Table 1.

COMPARATIVE EXAMPLE 1

The experimental procedure was substantially the same as in Example 1 except that the acrylic rubber composition, referred to as the composition IV hereinbelow, was formulated by replacing the siloxane A with the same amount of stearic acid. The curable composition IV had good moldability but the releasability thereof was very poor not only to cause difficulties in roll milling but also not to be taken out of the metal mold by firmly adhering thereto. Accordingly, the test for the mechanical properties could not be undertaken.

COMPARATIVE EXAMPLE 2

The experimental procedure was substantially the same as in Example 1 except that the acrylic rubber composition, referred to as the composition V hereinbelow, was formulated by replacing the siloxane A with the same amount of a low-molecular $\alpha,\omega$-dihydroxy dimethylpolysiloxane. The curable composition V had poor moldability with some foaming. The results of the evaluation test of this composition V are shown in Table 1.

COMPARATIVE EXAMPLE 3

The experimental procedure was substantially the same as in Example 3 excepting omission of the siloxane A in the formulation of the acrylic rubber composition, referred to as the composition VI hereinbelow. The curable composition VI had somewhat poor moldability with foaming. The results of the evaluation test of this composition are shown in Table 1.

TABLE 1

| Composition No. | I | II | III | IV | V | VI |
|---|---|---|---|---|---|---|
| Releasability from roll | 7 | 7 | 10 | 2 | 10 | 4 |
| Releasability from metal mold | 10 | 10 | 10 | 0 | 7 | 3 |
| Hardness, JIS A | 70 | 63 | 60 | — | 68 | 62 |
| Ultimate elongation, % | 298 | 190 | 195 | — | 255 | 185 |
| Tensile strength, kgf/cm² | 143 | 95 | 88 | — | 115 | 75 |
| Tear strength, kgf/cm | 30 | 47 | 43 | — | 22 | 40 |
| Permanent compression set, %, after 70 hours at 150° C. | 28 | 16 | 22 | — | 26 | 18 |
| Elastic resilience | 23 | 20 | 24 | — | 25 | 22 |
| Cold resistance $T_{10}$, °C. | −25 | −43 | −44 | — | −23 | −40 |

TABLE 1-continued

| Composition No. | I | II | III | IV | V | VI |
|---|---|---|---|---|---|---|
| by Gehman torsion test | | | | | | |

What is claimed is:

1. An acrylic rubber composition which comprises, as a blend:

(a) 100 parts by weight of an acrylic polymer which is a copolymerizate of an ester of acrylic or methacrylic acid of the formula $$CH_2=CR^1-CO-OR^2,$$

in which $R^1$ is a hydrogen atom or a methyl group and $R^2$ is an alkyl group or alkoxyalkyl group, and a monomeric compound having, in a molecule, at least two aliphatically unsaturated linkages;

(b) from 10 to 150 parts by weight of a reinforcing carbon powder of finely divided silica filler having a specific surface area of at least 10 m²/g; and (c) from 0.5 to 5 parts by weight of an organopolysiloxane of the formula $$R^4-SiR^3{}_2-O-(-SiR^3R^5-O-)_x-(-SiR^3{}_2-O-)_y-SiR^3{}_2-R^4,$$

in which $R^3$ is a monovalent hydrocarbon group having 1 to 6 carbon atoms, $R^4$ and $R^5$ are each independently a methyl group or a carboxyl-functional group bonded to the silicon atom through an Si—C linkage, with the proviso that one of the groups denoted by $R^4$ and $R^5$ is not a methyl group, x and y are each a positive integer, x+y is 5 to 800 and x:y is 0.01 to 0.1 on the average.

2. The acrylic rubber composition as claimed in claim 1 in which the monomeric compound having at least two aliphatically unsaturated linkages in a molecule is an ester of acrylic acid or methacrylic acid with a group having a silicon-bonded vinyl group.

3. The acrylic rubber composition as claimed in claim 2 in which the ester of acrylic acid or methacrylic acid with a group having a silicon-bonded vinyl group is a compound expressed by the structural formula $$CH_2=CR-CO-O+CH_2)_3SiMe+O-SiMeVi)_3O-,$$

in which R is a hydrogen atom or a methyl group.

4. The acrylic rubber composition as claimed in claim 1 in which the acrylic copolymer is a copolymer of 100 parts by weight of the ester of acrylic or methacrylic acid and from 0.01 to 10 parts by weight of the monomeric compound having at least two aliphatically unsaturated linkages in a molecule.

5. The acrylic rubber composition as claimed in claim 1 in which the carboxyl-functional group is a carboxyl group bonded to a divalent group having 2 to 25 carbon atoms.

6. The acrylic rubber composition as claimed in claim 5 in which the divalent group having 2 to 25 carbon atoms is an alkylene group or an alkylene group having an oxygen atom or a sulfur atom between carbon atoms to form an ester linkage or a thioether linkage, respectively.

7. The acrylic rubber composition as claimed in claim 1 further comprising a curing agent in an amount sufficient to cure the composition.

8. The acrylic rubber composition as claimed in claim 7 in which the curing agent is an organic peroxide.

9. The acrylic rubber composition as claimed in claim 8 in which the amount of the organic peroxide is 0.5 to 5.0 parts by weight per 100 parts by weight of the acrylic copolymer as the component (a).

10. The acrylic rubber composition according to claim 1, wherein $R^2$ is methyl, ethyl, propyl, butyl, 2-methoxyethyl, 2-ethoxyethyl, trifluoromethyl, 2,2,2-trifluoroethyl or 3,3,3-trifluoropropyl.

11. The acrylic rubber composition according to claim 1, wherein $R^3$ is methyl, ethyl, propyl, butyl, hexyl, cyclohexyl, alkyl, allyl or phenyl, each optionally substituted by halogen or cyano.

12. The acrylic rubber composition according to claim 11, wherein $R^3$ is chloromethyl, 3,3,3-trifluoropropyl or 2-cyanoethyl.

* * * * *